UNITED STATES PATENT OFFICE.

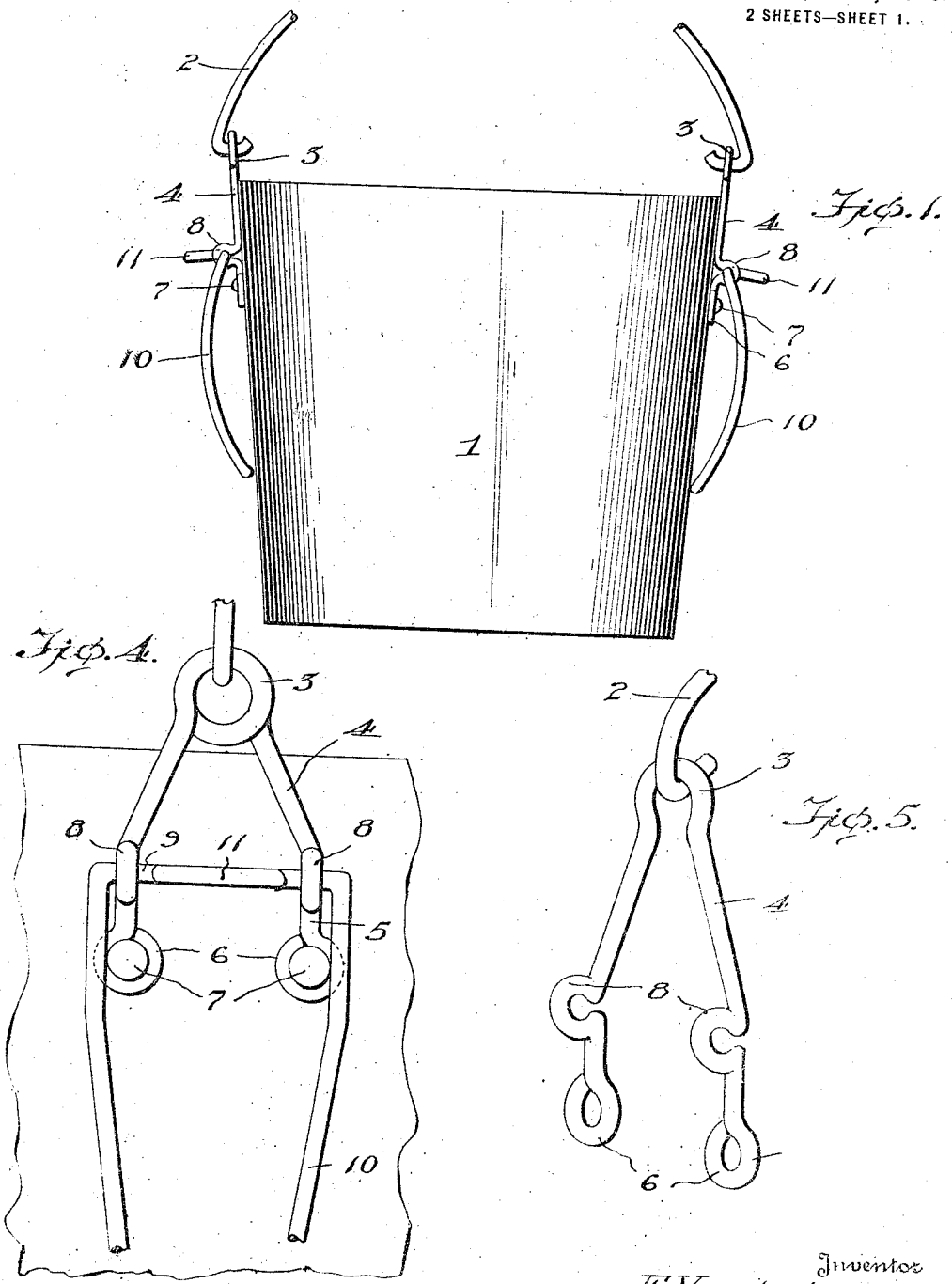

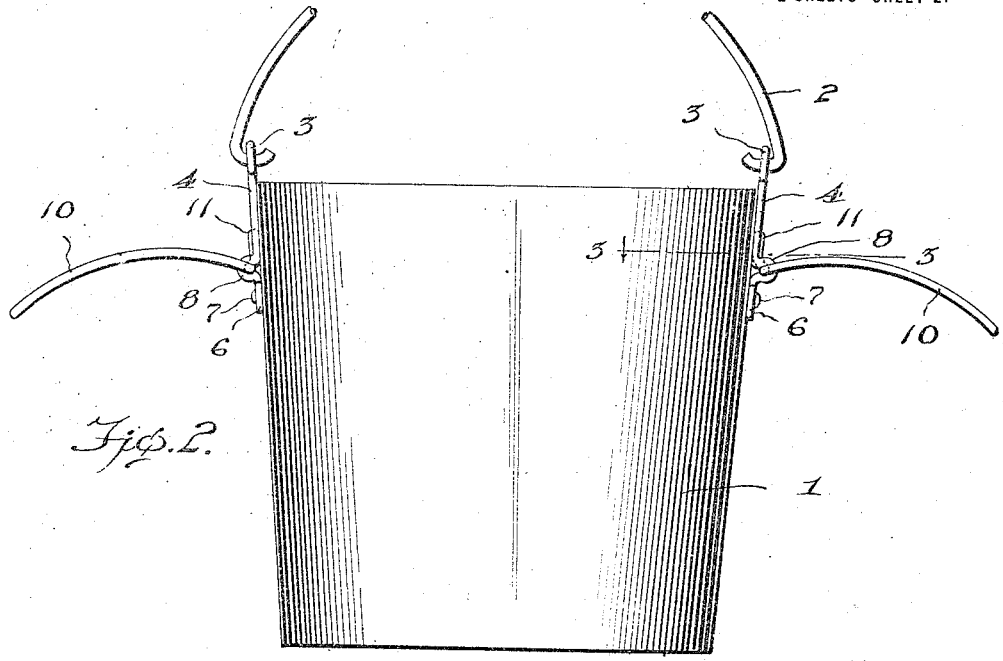
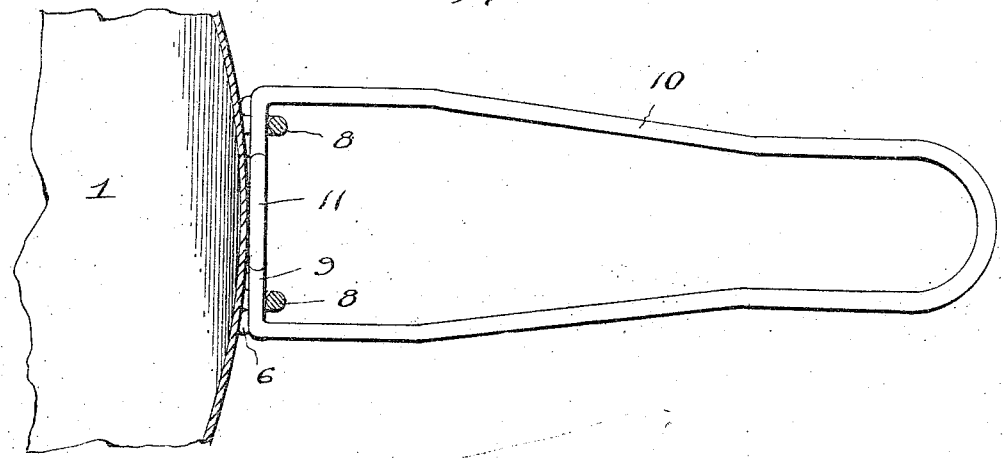

FRANK VANDERLAAN, OF HOLMEN, WISCONSIN.

PAIL-SUPPORTER.

1,168,980. Specification of Letters Patent. Patented Jan. 18, 1916.

Application filed October 5, 1914. Serial No. 865,163.

*To all whom it may concern:*

Be it known that I, FRANK VANDERLAAN, a subject of the Queen of Holland, residing at Holmen, in the county of La Crosse and State of Wisconsin, have invented certain new and useful Improvements in Pail-Supporters; and I do hereby declare the following to be a full, clear, and exact description of the invention, such as will enable others skilled in the art to which it appertains to make and use the same.

This invention comprehends certain new and useful improvements in pail supporters and has for its primary object to provide a form of supporter which may be readily attached to a pail or the like to support the same upon the knees of a party, thereby making it unnecessary for a party milking to employ one hand for holding the pail or else merely rest the pail upon the ground.

The invention has for another object to provide a pail support of this character which will be of exceedingly simple construction and may be readily supported by the handle supporting ears without materially altering the construction of the ears.

The invention has for a further object to provide a pail supporter of this character which will be of exceedingly simple and cheap construction as well as highly efficient in use and which, when not in operative position will lie against the side of the pail beneath the handle ears and which will also be provided with means for limiting upward swinging movement of said supporters.

With the above and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of my improved supporters attached to a milking pail of conventional design. Fig. 2 is a view similar to Fig. 1 with the supporters raised to operative position. Fig. 3 is an enlarged detail cross section on the plane of line 3—3 of Fig. 2, looking in the direction indicated by the arrow. Fig. 4 is an enlarged fragmentary side elevation at right angles to Figs. 1 and 2 showing the manner in which the supporters are mounted in the handle carrying ears, and Fig. 5 is a fragmentary perspective view of one of the ears with the end of the handle positioned therein.

Referring more particularly to the drawings in which similar reference characters designate corresponding parts throughout the several views, 1 designates a pail of conventional form having the usual bail handle 2 which has its opposite ends turned inwardly and secured in the upper smaller end 3 of the pail handle supporting ears 4 which are of substantially U-shape form and constructed of strong wire, the opposite legs of the wire forming each ear 4 diverging slightly from the upper small end 3 of the ear which is the center of the substantially U-shape wire, the free ends of the legs of the wire being bent parallel to one another, as shown at 5, and then looped as shown at 6 and engaged around the rivets 7 or other suitable securing means employed for secting the ears 4 to the opposite sides of the pail. The parallel portions of the legs of the U-shaped members forming the ears 4 are off-set outwardly and looped, as shown at 8 to form supporting eyes for the pail supports which have their straight inner ends 9 engaged through said off-set and looped portions 8. The pail supports are designated by the numeral 10 and are loop shape with their opposite sides curved upwardly, as will be readily understood by referring to the drawings.

The opposite sides of the pail supporters 10 are curved outwardly so that they may readily rest across the limbs of the party sitting upon a stool or the like and milking cows with the pail 1 resting between the party's legs, thereby making it unnecessary for the party to employ one hand to hold the pail or leave the same resting upon the ground where it may be readily overturned.

An upward swinging movement of the pail supporters 10 is limited by engagement of the stop loops 11 formed at the center of the straight inner ends 9 of said pail supporters 10 and extended at right angles to the direction in which the main portions or sides of the pail supporters 10 are extended, the stop loops 11 being adapted for engagement against the sides of the pail 1 when said supporters are in their raised or extended positions.

From the foregoing it will be readily seen that I have provided a pail supporter and handle carrying ear of extremely simple construction and which will be strong and durable as well as highly efficient in use and cheap to manufacture. It will also be seen that this form of supporter and handle carrying ear may be readily attached to pails of the form now in general use.

While the preferred embodiment of the invention has been shown and illustrated, it will be understood that minor changes in the details of construction and arrangement of parts may be made within the scope of the appended claims without departing from the spirit of the invention or sacrificing any of the advantages thereof.

What is claimed is:—

1. The combination with a pail and pail handle, of a pair of handle carrying ears formed of a single piece of wire looped centrally and provided with outwardly diverging legs, which are offset outward, terminal ends terminating into rivet receiving eyelets, for securing the same to a pail, intermediate loops adapted to hold supporting members therein, its upper loop adapted to receive the ends of the pail handle when the same is in use.

2. The combination with a pail and pail handle, of a pair of handle carrying ears formed of a piece of wire looped centrally thereof forming two arms, said arms having outwardly offset loops intermediate their ends their terminal ends terminating into rivet receiving eyelets for securing the ears to the side of a pail, a plurality of pail supporters secured through the intermediate loop, means at the inner ends of the supporting members adapted to engage the sides of the pail to prevent the upward movement of the same when in use.

3. The combination with a pail and handle thereof, of a pair of handle carrying ears formed of wire, said ears looped centrally forming two outwardly diverging arms, said arms being offset outwardly intermediate their ends forming supporting loops, the terminal ends of said arms terminating into rivet receiving loops for securing the ears to the side of a pail, a pair of L-shaped supporting members having their inner ends curved upwardly secured through the intermediate loops, their upturned ends adapted to engage the outer surface of a pail and limit the upward movement of said supporting members, the longer arm or main portion of said L-shaped members being curved to conform to the legs for supporting a pail therebetween when in use.

In testimony whereof I affix my signature in presence of two witnesses.

FRANK VANDERLAAN.

Witnesses:
OSCAR HAUG,
CLARENCE SKOGEN.

Copies of this patent may be obtained for five cents each, by addressing the "Commissioner of Patents, Washington, D. C."